United States Patent [19]

Strand

[11] Patent Number: 4,742,738

[45] Date of Patent: May 10, 1988

[54] MACHINE ADJUSTABLE BORING BAR ASSEMBLY AND METHOD

[75] Inventor: Kevin O. Strand, Garfield Heights, Ohio

[73] Assignee: Erickson Tool Co., Willoughby, Ohio

[21] Appl. No.: 738,462

[22] Filed: May 28, 1985

[51] Int. Cl.$^4$ ............................................. B23B 29/034
[52] U.S. Cl. ......................................... 82/1 C; 82/1.4; 408/161
[58] Field of Search ................. 82/1.2, 1.4, 2 E, 28 R, 82/1 C; 408/161; 29/568

[56] References Cited

U.S. PATENT DOCUMENTS

| | | | |
|---|---|---|---|
| 3,246,545 | 4/1966 | Shugars | 82/1.2 |
| 4,567,794 | 2/1986 | Bald | 82/28 R X |
| 4,573,379 | 3/1986 | Bald | 82/1.2 X |
| 4,573,380 | 3/1986 | Bald | 82/28 R |

*Primary Examiner*—Z. R. Bilinsky
*Attorney, Agent, or Firm*—Pearne, Gordon, McCoy & Granger

[57] ABSTRACT

A machine adjustable boring bar assembly is disclosed for use with a rotatable spindle of a machine tool which accepts interchangeable tools. This assembly includes an elongated boring bar body interchangeably mounted in a rotatable machine tool spindle and with a transversely movable tool mount on the distal end of the boring bar body. First and second external sleeves are rotatably mounted on the body with a motion transmission connection between the sleeves and a tool mount to establish transverse tool adjustment upon selectively holding stationary or rotating in selected directions the two sleeves by means of pinion reaction members driven by motors. The motion transmission connection includes planetary gearing for a wide range of rates of radial motion of the tool mount so that this adjustment may be effected during the time when the boring bar assembly is mounted in the rotatable machine tool spindle and actually cutting a workpiece for step turning, undercutting, or taper cutting. The foregoing abstract is merely a resume of one general application, is not a complete discussion of all principles of operation or applications, and is not to be construed as a limitation on the scope of the claimed subject matter.

19 Claims, 2 Drawing Sheets

MACHINE ADJUSTABLE BORING BAR ASSEMBLY AND METHOD

BACKGROUND OF THE INVENTION

Machine adjustable boring bars have previously been suggested, and among the first types were ones wherein a radial adjustment of the boring tool was possible, yet the tool holder was not interchangeable, i.e., it was generally a permanent part of the machine tool spindle. One of the first which achieved radial adjustment of the boring tool by means of a drive shaft was disclosed in U.S. Pat. No. 2,945,401. A longitudinally movable central rod was suggested for use in the radial adjustment of a boring tool in U.S. Pat. No. 3,740,161. An internal electric servomotor was suggested for this purpose in U.S. Pat. No. 3,237,486. A stylus and a contoured template were suggested for this purpose in U.S. Pat. No. 3,802,304. U.S. Pat. No. 3,822,618 disclosed a contour cam for this purpose. U.S. Pat. No. 4,328,722 disclosed the use of planetary gearing for radial adjustment of a tool, with the input to the planetary gearing coming from the rotatable spindle.

In more recent years, many machine tools have been equipped with tool changing mechanisms to change tools from a magazine into the operating spindle. The radial adjustment of such a boring tool on an interchangeable tool holder has also been suggested in U.S. Pat. No. 4,354,305. In this case, the radial adjustment was by a longitudinally movable central rod in the machine tool spindle. Also, in U.S. Pat. Nos. 4,447,177 and 4,451,185, radial adjustment was made by means of planetary gearing together with means to hold the ring gear stationary. In these latter two patents, the one input to the planetary gearing was from the machine tool spindle, and only minor adjustments in radial position were established because the tool holder had a slot to establish an effective hinge portion to permit slight bending movements of the cutting tool mount.

SUMMARY OF THE INVENTION

Accordingly, the problem to be solved is how to establish radial adjustment of a boring tool wherein the boring tool is on a tool holder which is interchangeable with many other tool holders in the machine tool environment. Also, the boring tool is to have a considerable range of movement, and to be capable of this movement during rotation of the machine tool spindle, and more especially to have this adjustment during actual cutting conditions of the tool in a workpiece so that tapers, undercuts, and step boring may be accomplished.

This problem is solved by a machine adjustable boring bar assembly for use with a rotatable spindle of a machine tool having interchangeable tools, said boring bar assembly including an elongated boring bar body extending along a longitudinal axis, a mounting end on said body adapted to be inserted coaxially into and rotated by the machine tool spindle, a transversely movable tool mount on the distal end of said boring bar body, means to mount a cutting tool on said movable tool mount, an external sleeve rotatably mounted on said body, a motion transmission connection between said sleeve and said tool mount to establish transverse tool adjustment upon rotation of said sleeve relative to said body, and means, during rotation of said body by the machine tool spindle, to rotate said sleeve relative to said body at a speed other than the speed of said body.

The problem is further solved by a machine adjustable boring bar assembly for use with a rotatable spindle of a machine tool having interchangeable tools, said boring bar assembly including an elongated boring bar body extending along a longitudinal axis, a mounting end on said body adapted to be inserted coaxially into and rotated by the machine tool spindle, a transversely movable tool mount on the distal end of said boring bar body, means to mount a cutting tool on said movable tool mount, planetary gearing including a ring gear member rotatably journaled on said boring bar body, a planet carrier member and a sun gear member in said planetary gearing, means providing a motion transmitting connection between said tool mount and one of said planetary gearing members, and reaction means mounted for selective rotation around a second axis parallel to the axis of said spindle for selective engagement with one of said planetary gearing members to establish relative rotation among said members of said planetary gearing and said boring bar body to effect transverse adjustment of said tool mount while said boring bar assembly is mounted in the machine tool spindle.

The problem is further solved by the method of adjusting the cutting diameter of an adjustable boring bar assembly for use with a rotatable machine tool spindle capable of accepting interchangeable tools, the boring bar assembly having a cutting tool on a transversely movable tool mount on a boring bar body, an externally accessible sleeve being rotatable on the body with a motion transmitting connection between the rotatable sleeve and the movable tool mount, said method including the steps of engaging the sleeve with a rotatable reaction member mounted on the stationary part of the machine tool adjacent the spindle, rotating the machine tool spindle through a given angle in a selected rotational direction, and selectively holding stationary or rotating said reaction member to establish relative rotation between the sleeve and the boring bar body in a selected rotational direction to effect transverse adjustment of the tool mount while the boring bar assembly is mounted in the machine tool spindle and the machine tool spindle is rotated.

Accordingly, an object of the invention is to provide a radial adjustment of a boring tool with a wide range of adjustment, and yet a very fine and precise adjustment.

Another object of the invention is to provide a machine adjustable boring bar assembly utilizing a planetary gearing with an external pinion to provide a supplementary input to the planetary gearing.

Still another object of the invention is to provide a method of adjusting the cutting diameter of an adjustable boring bar assembly especially during actual machining of a workpiece.

Other objects and a fuller understanding of the invention may be had by referring to the following description and claims, taken in conjunction with the accompanying drawing.

DESCRIPTION OF THE PREFERRED EMBODIMENTS

Figure 1:
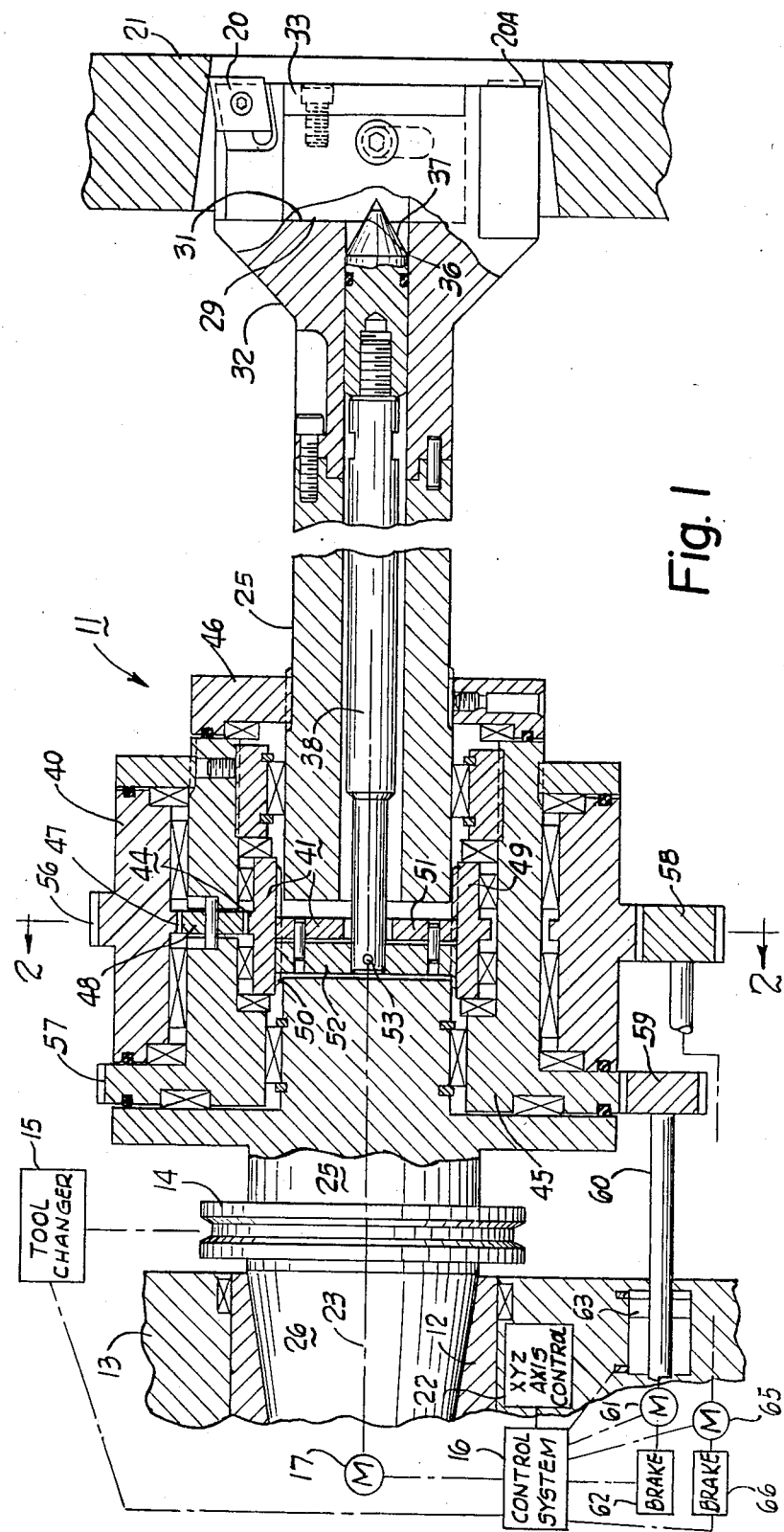
FIG. 1 is a longitudinal, sectional view through a machine tool spindle and adjustable boring bar assembly in accordance with the invention.

The figures of the drawing illustrate the machine adjustable boring bar assembly 11. This boring bar assembly is used with a rotatable spindle 12 of a machine tool 13. The boring bar assembly 11 has a V-flange 14 or other suitable means so that the assembly 11 may be gripped by a tool changer 15 and inserted into the machine tool spindle 12 or removed therefrom to be placed in a tool magazine (not shown). The machine tool 13 has a control system 16 to control the operation of a drive motor 17 to rotate the rotatable spindle 12. The boring bar assembly 11 is adapted to have a cutting tool 20 which will cut a workpiece 21. The control system 16 controls an XYZ axis control 22 for relative movement on X, Y, and Z axes between the cutting tool 20 and the workpiece 21. In many machine tools, the rotatable spindle 12, rotatable about a longitudinal axis 23, is also longitudinally movable about this longitudinal or Z axis. Also, usually the workpiece 21 may be movable on X and Y axes mutually perpendicular to each other, and perpendicular to the Z axis, but in any event all three axes are controlled for relative movement in the machine tool 13.

The interchangeable boring bar assembly 11 has a boring bar body 25 with a mounting end 26 which may be many shapes, including cylindrical, for example, when used with automotive type machine tools, but is shown with a conical mounting end to be received in the complementarily shaped, rotatable spindle 12. It may be keyed therein for positive rotation therewith. The aforementioned V-flange 14 is on this boring bar body 25 and is usually placed close to the mounting end 26.

The cutting tool 20 is carried on a tool mount 29, which is shown in this preferred embodiment as a tool slide. This tool mount 29 may have a radial movement, or merely a lateral movement, relative to the axis 23, which has a radial component so that the radial position of the cutting tool 20 may be adjusted. In this particular boring bar assembly 11, for symmetry, there are two tool mounts 29 and 30, with the tool mount 30 carrying an additional cutting tool 20A. The structure supporting the two tool mounts 29 and 30 is identical, so only one will be described.

The tool mount 29 slides within a recess 31 in the distal end 32 of the boring bar 25. A retaining plate 33 covers the outer end of this recess 31 to retain the tool mount slide 29 longitudinally within the recess. A compression spring 34 acts against a shoulder 35 on the tool mount 29 at a slight angle to the slide movement of the tool mount 29 and urges this tool mount radially inwardly. A cam follower 36 is provided on the radially inner end of the tool mount 29, and this cam follower is at an acute angle relative to the longitudinal axis 23. This cam follower may have a 30-degree angle, for example. The cam follower 36 is acted on by a cam 37 moved by a central rod 38.

Figure 2:
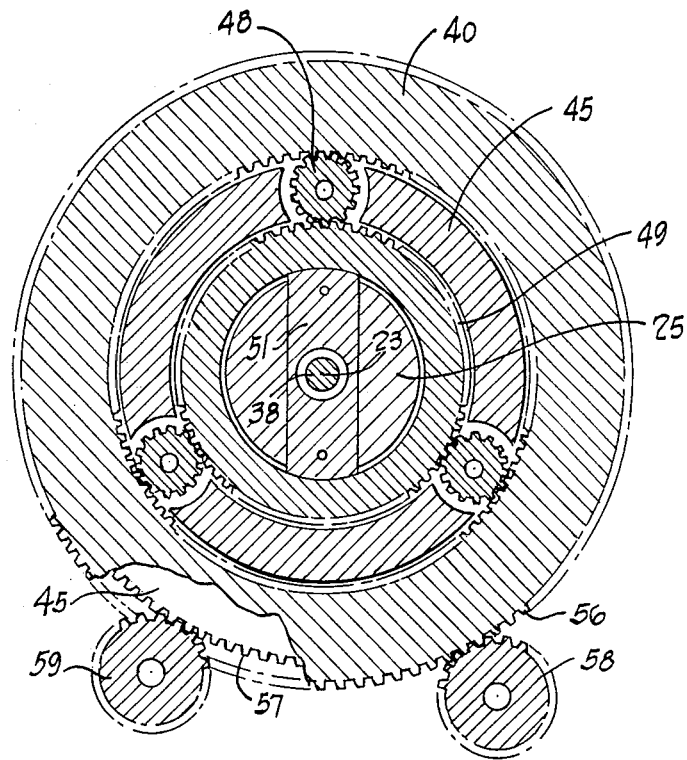
FIG. 2 is a sectional view on line 2—2 of FIG. 1.

An external sleeve 40 is rotatably mounted on the boring bar body 25, and a motion transmission connection 41 interconnects this external sleeve 40 and the tool mounts 29 and 30. This motion transmission connection 41 includes the cam 37 and cam follower 36, as well as the central rod 38. This motion transmission connection 41 further includes reduction gearing 44. This reduction gearing has a large gear ratio, and, to accomplish this in a small space, a differential gearing, or planetary gearing, is utilized, and hereinafter this will be referred to as "planetary gearing 44." This planetary gearing 44 includes a planet carrier 45 journaled on the boring bar body 25, and held in place by a threaded thrust plate 46. The external sleeve 40 is journaled on this planet carrier 45 and has an internal ring gear 47 therein. This internal ring gear meshes with planet gears 48 journaled in the planet carrier 45, and there may be three such planet gears as shown in FIG. 2. Journaled internally of the planet carrier 45 is a sun gear 49 having external teeth meshing with the planet gears 48. The sun gear 49 has an internal thread 50 which meshes with an external thread on first and second crosspieces 51 and 52. The crosspiece 51 is linked to the second crosspiece 52, slightly out-of-phase, and spaced apart by a Belleville washer spring (not shown) for an anti-blacklash threaded connection to the sun gear 49. The second crosspiece 52 is pinned at 53 to the longitudinally disposed central rod 38.

The external sleeve 40 has an external ring gear 56, and the planet carrier 45 may be considered to be a sleeve which is externally accessible at an external ring gear 57. A rotatable pinion gear 58 is longitudinally slidable into meshing engagement with the external ring gear 56 and, similarly, a pinion 59 is longitudinally slidable into meshing engagement with the external ring gear 57. The pinion 59 is fixed on a shaft 60 rotated by a motor 61 and braked by a brake 62. The pinion 59 may be longitudinally moved into and out of mesh with the external ring gear 57 by a fluid-actuated piston 63. In a similar way, the pinion 58 may be rotated by a motor 65 and braked by a brake 66 and moved by a fluid-actuated piston (not shown). The fluid-actuated pistons, motors, and brakes are controlled in actuation by the control system 16. The control system 16 may include a tachometer and pulse generator on the motor 17 for accurate positioning and motion control of the pinions 58 and 59.

OPERATION

The pinions 58 and 59 are reaction means which are mounted for selective rotation around axes parallel to but spaced from the spindle axis 23, and for selective engagement with the external ring gears 56 and 57, respectively. These reaction means acting through the reduction gearing establish relative rotation among the various members of the planetary gearing 44 and the boring bar body 25 to effect transverse adjustment of the tool mounts 29 and 30. This transverse adjustment is effected while the boring bar assembly 11 is mounted in the machine tool spindle 12, rather than following the common practice of effecting this adjustment outside the machine tool 13.

Figure 3:
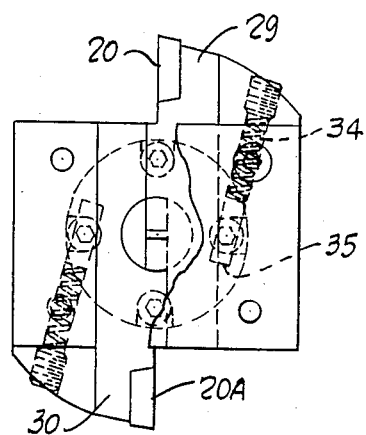
FIG. 3 is an end view of the boring bar assembly.

A still further feature of the invention is that the transverse adjustment of the tool mounts may be accomplished during actual machining. This permits step boring, undercutting, and cutting tapers of either increasing or decreasing cutting radii. For example, the two pinions 58 and 59 may be moved into meshing engagement with the ring gears 56 and 57, respectively, by the fluid-actuated pistons, the pinion 59 held stationary by the brake 62 and the pinion 58 rotated in a selected direction by the motor 65. This adjustment of the cutting diameter during actual machining permits use of the two tools 20 and 20A to perform the cutting, as shown in FIGS. 1 and 3. This is different from the prior art, wherein cutting diameter changes during actual machining were effected only by a single point tool, e.g., by relative movement of the machine tool spindle 12 and the workpiece 21 along the X-axis. Alternatively, 20A may not be a cutting tool but may be a balancing mass or engagement ball.

Another possible mode of operation is for the pinion 59 to be rotated in a selected direction while the pinion 58 is held stationary. A third mode is to have both pinions 58 and 59 rotated in selected directions.

The radial motion equation of the cutting tool 20 or 20A is:

$$RM = \tan \alpha \text{ pitch} \left\{ -W_{58} \frac{N_{58} \cdot N_{47}}{N_{56} \cdot N_{49}} + W_{59} \cdot \frac{N_{59}}{N_{45}} \left(1 + \frac{N_{47}}{N_{49}}\right) + W_{25} \right\} \quad (1)$$

wherein:
- $N_{49}$—number of teeth on O.D. of sun gear 49
- $N_{47}$—number of teeth on I.D. of sleeve 40
- $N_{56}$—number of teeth on O.D. of sleeve 40
- $N_{45}$—number of teeth on O.D. of carrier 45
- $N_{59}$—number of teeth on pinion 59 that drives the carrier 45
- $N_{58}$—number of teeth on pinion 58 that drives the sleeve 40
- Pitch—pitch of thread on crosspiece 51
- RM—radial motion of cutting tool 20 (expressed as a displacement or rate)
- $\alpha$—one-half of the included angle on the actuating cam 37
- $W_{59}$—rotation of pinion 59 that drives carrier 45 (expressed as a displacement or rate)
- $W_{58}$—rotation of pinion 58 that drives sleeve 40 (expressed as a displacement or rate)
- $W_{25}$—rotation of boring bar body (expressed as a displacement or rate)

This equation (1) shows the great versatility in being able to select many different rates of radial motion of the tool mount. This permits minute adjustments for correcting for tool wear to cut workpieces to very close tolerances. It also permits rather rapid radial motion relative to the longitudinal movement along the Z axis so that tapers, either conical or other shapes, may be generated. Also still faster radial motion is permitted in order to cut step bores in the workpiece.

The reaction member pinions 58 and 59 are mounted on axes which are stationary relative to the machine tool 13, at least when in the operative position engaging the external ring gears 56 and 57. These pinions 58 and 59 may be retracted out of meshing engagement in order to permit the tool changer 15 to grasp the V-flange 14 and swing the boring bar assembly 11 into or out of the machine tool spindle 12.

The reduction gearing 44 is a differential or planetary mechanism having two inputs at the external teeth 56 and 57 and a single output to drive the cam 37 longitudinally for the radial adjustment of the tool mounts. The control system 16 may be a computer numerical control or a microprocessor, for example, with many examples being known in the prior art. Such control system is capable of controlling the rotation of the motors 61 and 65 in a selected direction and at a selected speed. For example, these may be stepping motors which may be accurately rotationally positioned in minute increments.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A machine adjustable boring bar assembly for use with a rotatable spindle of a machine tool having interchangeable tools, said boring bar assembly including:
   - an elongated boring bar body extending along a longitudinal axis;
   - a mounting end on said body adapted to be inserted coaxially into and rotated by the machine tool spindle;
   - a transversely movable tool mount on the distal end of said boring bar body;
   - means to mount a cutting tool on said movable tool mount;
   - an external sleeve rotatably mounted on said body;
   - a planetary gearing motion transmission connection between said sleeve and said tool mount to establish transverse tool adjustment upon rotation of said sleeve relative to said body;
   - means, during rotation of said body by the machine tool spindle, to rotate said sleeve relative to said body at a speed other than the speed of said body;
   - said planetary gearing having two inputs and having an output connected to said tool mount;
   - means connecting one input to said sleeve; and
   - means connecting the other input to a second rotatable sleeve on said body.

2. A boring bar assembly as set forth in claim 1, including first and second reaction means on the machine tool adapted to selectively hold stationary or rotate the first-mentioned and said second sleeve, respectively.

3. A machine adjustable boring bar assembly for use with a rotatable spindle of a machine tool having interchangeable tools, said boring bar assembly including:
   - an elongated boring bar body extending along a longitudinal axis;
   - a mounting end on said body adapted to be inserted coaxially into and rotated by the machine tool spindle;
   - a transversely movable tool mount on the distal end of said boring bar body;
   - means to mount a cutting tool on said movable tool mount;
   - planetary gearing including a ring gear member rotatably journaled on said boring bar body;
   - a planet carrier member and a sun gear member in said planetary gearing;
   - means providing a motion transmitting connection between said tool mount and one of said planetary gearing members;
   - reaction means mounted for selective rotation around a second axis parallel to the axis of said spindle for selective engagement with one of said planetary gearing members to establish relative rotation among said members of said planetary gearing and said boring bar body to effect transverse adjustment of said tool mount while said boring bar assembly is mounted in the machine tool spindle;
   - both said planet carrier and ring gear members being externally accessible; and said reaction means being selectively engageable with said planet carrier and ring gear members for rotation thereof relative to said body.

4. A boring bar assembly as set forth in claim 3, wherein said motion transmitting means includes an internal thread on said sun gear member and an external threaded member engageable therewith.

5. A boring bar assembly as set forth in claim 3, wherein said motion transmitting means includes a cam follower on said tool mount and a cam cooperable therewith movable by rotation of said sun gear member relative to said body.

6. A boring bar assembly as set forth in claim 3, wherein said reaction means is engageable with said ring gear member to rotate the same relative to said body.

7. A boring bar assembly as set forth in claim 3, wherein said ring gear member is concentric with and on the exterior of said body;
external teeth on said ring gear member;
and said reaction means including a pinion movable to be selectively engageable with said external teeth.

8. A boring bar assembly as set forth in claim 3, wherein said reaction means includes pinion means selectively engageable with teeth on said planet carrier member.

9. A boring bar assembly as set forth in claim 8, wherein said pinion means includes first and second pinions.

10. A boring bar assembly as set forth in claim 3, wherein said planetary gearing includes an externally accessible gear, and said reaction member includes a pinion selectably engageable with said externally accessible gear.

11. A boring bar assembly as set forth in claim 10, including means to drive said pinion in a selected direction or to hold it non-rotative.

12. A boring bar assembly as set forth in claim 10, including means to drive said pinion at a selected speed during rotation of the machine tool spindle.

13. A boring bar assembly as set forth in claim 3, including external teeth on each of said planet carrier and ring gear members; and said reaction means including pinion means selectively engageable with said external teeth for rotation thereof.

14. The method of adjusting the cutting diameter of an adjustable boring bar assembly for use with a rotatable machine tool spindle capable of accepting interchangeable tools, the boring bar assembly having a cutting tool on a transversely movable tool mount on a boring bar body, an externally accessible sleeve being rotatable on the body with a motion transmitting connection between the rotatable sleeve and the movable tool mount, said method including the steps of:
providing in said motion transmission connection planetary gearing with two inputs and with an output connected to move the tool mount, and one of said inputs being connected to said sleeve;
engaging the sleeve with a rotatable reaction member mounted on the stationary part of the machine tool adjacent the spindle;
rotating the machine tool spindle through a given angle in a selected rotational direction; and
acting on said reaction member and acting on the other of said inputs to establish relative rotation between the sleeve and the boring bar body in a selected rotational direction to effect transverse adjustment of the tool mount while the boring bar assembly is mounted in the machine tool spindle and the machine tool spindle is rotated.

15. The method as set forth in claim 14, including effecting transverse adjustment of the tool mount during rotation of the machine tool spindle and cutting of a workpiece.

16. The method as set forth in claim 19, including holding one input stationary and rotating the other input.

17. The method as set forth in claim 19, and a second externally accessible sleeve connected to the other of said inputs.

18. The method as set forth in claim 17, including acting on said second externally accessible sleeve to effect transverse adjustment of the tool mount.

19. The method as set forth in claim 14, including effecting adjustment of the cutting diameter during actual machining of a workpiece by two tools on two oppositely movable tool mounts.

* * * * *